US010853838B2

(12) United States Patent
Mu et al.

(10) Patent No.: US 10,853,838 B2
(45) Date of Patent: Dec. 1, 2020

(54) MEMORIZATION MODEL FOR CONTEXT VIOLATIONS (71) Applicant: Facebook, Inc., Menlo Park, CA (US)

(72) Inventors: Yang Mu, Fremont, CA (US); Emanuel Alexandre Strauss, San Mateo, CA (US); Daniel Olmedilla de la Calle, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 523 days.

(21) Appl. No.: 15/608,803

(22) Filed: May 30, 2017

(65) Prior Publication Data

US 2018/0349942 A1 Dec. 6, 2018

(51) Int. Cl.
*G06Q 30/00* (2012.01)
*G06Q 30/02* (2012.01)
*G06K 9/00* (2006.01)
*G06K 9/62* (2006.01)
*G06Q 50/00* (2012.01)

(52) U.S. Cl.
CPC ..... *G06Q 30/0242* (2013.01); *G06K 9/00442* (2013.01); *G06K 9/6267* (2013.01); *G06K 9/00456* (2013.01); *G06Q 50/01* (2013.01)

(58) Field of Classification Search
None
See application file for complete search history.

(56) References Cited

U.S. PATENT DOCUMENTS

| 9,009,834 | B1* | 4/2015 | Ren | G06F 21/10 |
| | | | | 709/224 |
| 2018/0013772 | A1* | 1/2018 | Schmidtler | H04L 63/1416 |
| 2018/0040029 | A1* | 2/2018 | Zeng | G06Q 30/0269 |
| 2018/0253661 | A1* | 9/2018 | Strauss | G06Q 50/01 |

* cited by examiner

*Primary Examiner* — Yehdega Retta
(74) *Attorney, Agent, or Firm* — Fenwick & West LLP (57) ABSTRACT For various content campaigns (or content), an online system predicts a likelihood score of context violations (e.g., account term violations) of a content campaign. The online system derives a plurality of feature vectors of the content campaign. The online system predicts a likelihood score of context violation of the content campaign using a memorization model based on the plurality of feature vectors. The memorization model comprises a plurality of categories and a plurality of items of each category. Each of the plurality of categories has a category weight, and each of the plurality of items of each category has an item weight. The predicted likelihood score is based on a combination of a plurality of category weights and a plurality of item weights associated with the plurality of feature vectors. The online system performs an action affecting the content campaign based in part on the predicted likelihood score.

18 Claims, 5 Drawing Sheets

Receives A Plurality Of Content Campaigns With Known Context Violations
410

Derive A Plurality Of Feature Vectors Of Each Of The Plurality Of Content Campaigns
420

Generate A Plurality Of Training Sets Based On The Plurality Of Feature Vectors
430

Train Each Item Weight Associated With Each Of A Plurality Of Items, And Each Category Weight Associated With Each Of A Plurality Of Categories
440

MEMORIZATION MODEL FOR CONTEXT VIOLATIONS

BACKGROUND

This disclosure relates generally to online systems, and more specifically to predicting bad content campaign violating policies of online systems using memorization models.

Online systems (such as social networking systems) allow content providers to deliver content in a content campaign that is targeted to certain online systems' users. However, the content may include context violations that violate policies of the online systems. For example, content providers may include improper content campaign or a user's interaction with the content may link the user to improper content or an improper external webpage. One useful approach is to use traditional models to predict how likely content violates policies of the online systems. Typically, training data labelled by human reviewers trains the traditional models. The human reviewers' false negatives may greatly affect prediction precision of the traditional models. For example, a single user ID may create several bad content campaigns. If one of the bad content campaigns was labelled by mistake, then this user ID's weight generated by the traditional models may decrease dramatically and other bad accounts created by this user ID may be likely missed by the traditional models. Additionally, the same user ID may create bad content campaigns using different features (such as landing page domain, title, images, etc.). Dynamic change of features associated with bad accounts may make the traditional models fail to correctly identify content by a malicious actor. Thus, improved automated prediction models may improve tolerance for false negatives and changed content campaigns.

SUMMARY

For various content campaigns (or content), an online system predicts a likelihood score of context violations (e.g., account term violations) of content campaign. The online system derives a plurality of feature vectors of the content campaign. Examples of the plurality of feature vectors may include characteristics of content that is created by the content campaign, and characteristics of context associated with the content campaign. For example, a feature may describe an image associated with the content by a hash value, and another feature may describe the user that created the content campaign. The online system predicts a likelihood score of context violation of the content campaign using a memorization model based on the plurality of feature vectors. The memorization model comprises a plurality of categories and a plurality of items of each category. Each of the plurality of categories has a category weight, and each of the plurality of items of each category has an item weight. The predicted likelihood score is based on a combination of a plurality of category weights and a plurality of item weights associated with the plurality of feature vectors. Rather than a generalized model, the memorization model identifies matches between features of the campaign and prior campaigns designated as improper. Thus, for each category, the predicted likelihood score may be determined by identifying a match between the corresponding feature of the content campaign and an item in the category. For example, in the "image" category, an image previously associated with an improper content campaign may be stored, and when a campaign matches that image, it may receive a weight for matching that image and for a match in the image category. Thus, in one embodiment, the online system categorizes each of the plurality of feature vectors into a corresponding category of the plurality of categories. For each categorized feature vector, the online system compares a categorized feature vector associated with each item in the corresponding category, and determines an item weight and a category weight associated with the categorized feature vector based on the comparison, and generates a sub-combination of the item weight and the category weight. The online system generates the likelihood score based on a combination of a plurality of sub-combinations, and each sub-combination is associated with a categorized feature vector of the plurality of feature vectors. The online system performs an action affecting the content campaign based in part on the predicted likelihood score.

In some embodiments, the online system uses the memorization model in a combination with a traditional model (e.g., a dense model) to provide an alternate judgment of the appropriateness of the content campaign. For example, the online system may use outputs of one of the models as a training set to train the other model. In another example, the online system may perform an action based on a combination of the predicted likelihood scores of the two models. In this way, the memorization model may improve predictions for content campaigns that include characteristics matching previously-rejected campaigns, while the dense model may better generalize to campaigns having new characteristics that do not match previous campaign properties.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
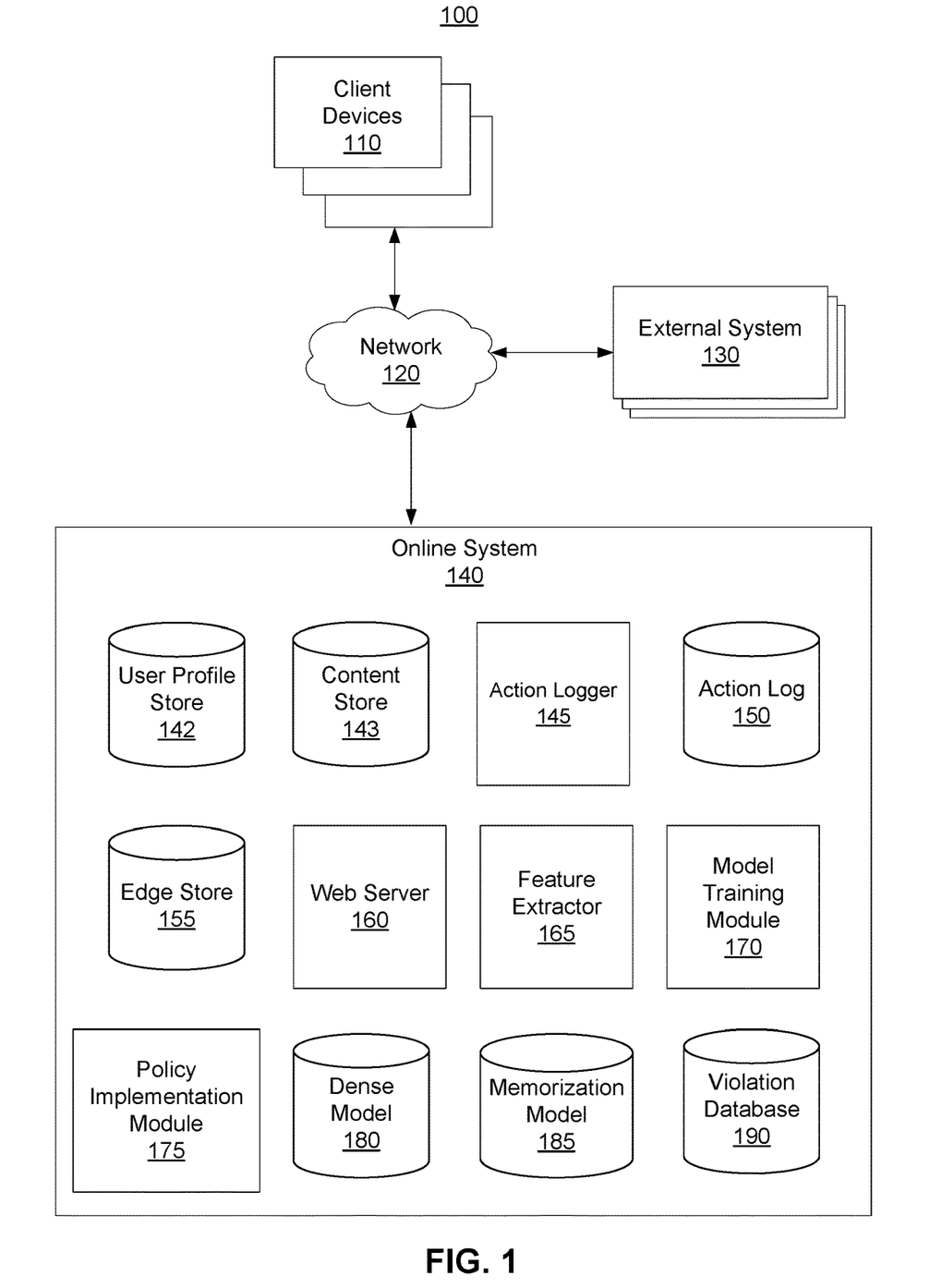
FIG. 1 is a system environment of an online system including a memorization model, in accordance with an embodiment.

FIG. 1 is a system environment 100 of an online system 140 including a memorization model 180, in accordance with an embodiment. The system environment 100 shown by FIG. 1 comprises one or more client devices 110, a network 120, one or more external systems 130, and the online system 140. In alternative configurations, different and/or additional components may be included in the system environment 100. The embodiments described herein can be adapted to online systems that are not social networking systems.

The client devices 110 are one or more computing devices capable of receiving user input as well as transmitting and/or receiving data via the network 120. In one embodiment, a client device 110 is a conventional computer system, such as a desktop or laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more external systems 130 may be coupled to the network 120 for communicating with the online system 140. In one embodiment, an external system 130 is an application provider communicating information describing applications for execution by a client device 110 or communicating data to client devices 110 for use by an application executing on the client device 110. In other embodiments, an external system 130 provides content or other information for presentation via a client device 110. An external system 130 may also communicate information to the online system 140, such as advertisements, content, or information about an application provided by the external system 130.

The online system 240 allows its users to post content to the online system 240 for presentation to other users of the online system 240, allowing the users interact with each other. Examples of content include stories, photos, videos, and invitations. Additionally, the online system 240 typically generates content items describing actions performed by users and identified by the online system 240. For example, a content item is generated when a user of an online system 240 checks into a location, shares content posted by another user, or performs any other suitable interaction.

Online System Configuration

The online system 140 shown in FIG. 1 includes a user profile store 142, a content store 143, an action logger 145, an action log 150, an edge store 155, a web server 160, a feature extractor 165, a model training module 170, a policy implementation module 175, a dense model 180, a memorization model 185, and a violation database 190. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 142. A user profile includes declarative information about the user that was explicitly shared by the user and may also include profile information inferred by the online system 140. In one embodiment, a user profile includes multiple data fields, each describing one or more attributes of the corresponding user of the online system 140. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the online system 140 displayed in an image. A user profile in the user profile store 142 may also maintain references to actions by the corresponding user performed on content items in the content store 143 and stored in the action log 150.

While user profiles in the user profile store 142 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 143 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 143, such as status updates, photos tagged by users to be associated with other objects in the online system 140, events, groups or applications. In some embodiments, objects are received from third-party applications or third-party applications separate from the online system 140. In one embodiment, objects in the content store 143 represent single pieces of content, or content "items." Hence, users of the online system 140 are encouraged to communicate with each other by posting text and content items of various types of media through various communication channels. This increases the amount of interaction of users with each other and increases the frequency with which users interact within the online system 140.

The action logger 145 receives communications about user actions internal to and/or external to the online system 140, populating the action log 150 with information about user actions. Examples of actions include adding a connection to another user, sending a message to another user, uploading an image, reading a message from another user, viewing content associated with another user, attending an event posted by another user, among others. In addition, a number of actions may involve an object and one or more particular users, so these actions are associated with those users as well and stored in the action log 150.

The action log 150 may be used by the online system 140 to track user actions on the online system 140, as well as actions on external systems 130 that communicate information to the online system 140. Users may interact with various objects on the online system 140, and information describing these interactions are stored in the action log 150. Examples of interactions with objects include: commenting on posts, sharing links, and checking-in to physical locations via a mobile device, accessing content items, and any other interactions. Additional examples of interactions with objects on the online system 140 that are included in the action log 150 include: commenting on a photo album, communicating with a user, establishing a connection with an object, joining an event to a calendar, joining a group, creating an event, authorizing an application, using an application, expressing a preference for an object ("liking" the object) and engaging in a transaction. Additionally, the action log 150 may record a user's interactions with advertisements on the online system 140 as well as with other applications operating on the online system 140. In some embodiments, data from the action log 150 is used to infer interests or preferences of a user, augmenting the interests included in the user's user profile and allowing a more complete understanding of user preferences.

The action log 150 may also store user actions taken on an external system 130, such as an external website, and communicated to the online system 140. For example, an e-commerce website that primarily sells sporting equipment at bargain prices may recognize a user of the online system 140 through a social plug-in enabling the e-commerce website to identify the user of the online system 140. Because users of the online system 140 are uniquely identifiable, e-commerce websites, such as this sporting equipment retailer, may communicate information about a user's actions outside of the online system 140 to the online system 140 for association with the user. Hence, the action log 150 may record information about actions users perform on the external system 130, including webpage viewing histories, advertisements that were engaged, purchases made, and other patterns from shopping and buying.

In one embodiment, the edge store 155 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Users and objects within the online system 140 can represented as nodes in a social graph that are connected by edges stored in the edge store 155.

In one embodiment, an edge may include various features each representing characteristics of interactions between users, interactions between users and object, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 155 also stores information about edges, such as affinity scores for objects, interests, and other users. Affinity scores, or "affinities," may be computed by the online system 140 over time to approximate a user's affinity for an object, interest, and other users in the online system 140 based on the actions performed by the user. A user's affinity may be computed by the online system 140 over time to approximate a user's affinity for an object, interest, and other users in the online system 140 based on the actions performed by the user. Multiple interactions between a user and a specific object may be stored as a single edge in the edge store 155, in one embodiment. Alternatively, each interaction between a user and a specific object is stored as a separate edge. In some embodiments, connections between users may be stored in the user profile store 142, or the user profile store 142 may access the edge store 155 to determine connections between users.

The web server 160 links the online system 140 via the network 120 to the one or more client devices 110, as well as to the one or more external systems 130. The web server 160 serves web pages, as well as other web-related content, such as JAVA®, FLASH®, XML and so forth. The web server 160 may receive and route messages between the online system 140 and the client device 110, for example, instant messages, queued messages (e.g., email), text messages, short message service (SMS) messages, or messages sent using any other suitable messaging technique. A user may send a request to the web server 160 to upload information (e.g., images or videos) that are stored in the content store 143. Additionally, the web server 160 may provide application programming interface (API) functionality to send data directly to native client device operating systems, such as IOS®, ANDROID™, WEBOS® or RIM®.

The feature extractor 165 generates feature vectors for each content campaign. A feature vector associated with a content campaign describes characteristics of content of the content campaign, and characteristics of context associated with the content campaign. Examples of characteristics of content may include targeting criteria (e.g., target users that the content will be delivered to, etc.), textual content (e.g., title, body, image, audio, video, etc.), topics associated with the content (e.g., derived from the textual content), posted time, and a posted location. Examples of characteristics of context associated with the content campaign may include information associated with account creator (e.g., user ID associated with the account creator, the account creator's user profile, the account creator's current location, administrator user ID, etc.), information associated with landing page (LP) (e.g., LP domain, onsite LP ID, offsite LP ID, etc.), and other information associated with context (e.g., administrator DATR, PhotoDNA, videoDNA, currency, etc.). Thus, these characteristics of the content and the context may describe both what the content is and the context in which it was provided for display to users.

The model training module 170 generates a training set using feature vectors extracted by the feature extractor 165 for each of a plurality of content campaigns. The model training module 170 generates a positive set and a negative set. The positive set includes feature vectors for which the content campaigns (also referred to as bad content campaigns) violate account terms of the online system (e.g., the content campaigns that include improper content or are associated with one or more malicious activities). The negative set includes feature vectors for which the content campaigns (also referred to as good content campaigns) do not violate account terms of the online system 140. The feature extractor 165 derives feature vectors for each of the multiple content campaigns. The training set module 170 generates a positive set using the feature vectors of the bad content campaign (for which the model should identify a high likelihood of policy violation), and a negative set using feature vectors of other remaining content campaigns that do not violate the account terms. In some embodiments, the training set is generated by human reviewers. The training set is stored in the violation store 190.

Additionally and/or alternatively, the training set may be generated from outputs of traditional models. For example, a dense model (also referred to as a traditional model) stored in the dense model 180 predicts a likelihood score of a content campaign indicating that the content campaign is a good content campaign. In contrast, the memorization model predicts a likelihood score of the same content campaign indicating that the content campaign is a bad content campaign. If the prediction of the memorization model is correct, the model training module 170 stores this content campaign into a training set store of the dense model for updating the dense model. If the prediction of the dense model is correct, the model training module 170 stores this content campaign into the violation database 190 for updating the memorization model. An example is further described in detail below with regard to FIG. 3.

The model training module 170 trains a memorization model using the generated training set. The memorization model "memorizes" prior information associated with bad content campaigns to assist future predictions. Thus, when there is a rejected campaign, the features of the content campaign are stored to determine a match for a future campaign to one of these features of the rejected campaign. For example, if one user ID created one single bad content campaign two years ago, the memorization model memorizes this user ID. In such way, even if a new bad content campaign created by this user ID is labeled by mistake (e.g., human reviewers label the new bad content campaign as a good content campaign by mistake), the memorization model is able to predict how likely this new bad content created by this user ID violates the account terms (e.g., the memorization model generates higher weight for the new bad content due to the user ID, rather that generating a zero weight for this new bad content like traditional models typically do). In another example, if a LP domain (or a title) was used in a single bad content campaign in the past, the memorization model memorizes this LP domain (or the title). If a new content campaign uses the same LP domain, the memorization model predicts how likely this new bad content created by this user ID violates the account terms.

In some embodiments, the memorization model generates a likelihood score to represent the likelihood of a content campaign violating policies based on a linear combination of two types of weights associated with the feature vectors. One type of weights is associated with a category of feature vectors (also referred to as category weights). The other type of weights is associated with items included in each category (also referred to as item weights). The category of feature vectors describes different types of features. Example categories of feature vectors may include characteristics of content, and characteristics of context associated with the content campaign. Each category of feature vectors includes a plurality of same-type feature vectors (also referred to as items) associated with bad campaigns that are memorized by the memorization model. In that sense, each feature previously associated with a rejected campaign is stored in an index for comparison to future campaigns. For example, if a category of feature vectors is associated with an image of content created by a content campaign, each item in the category is an image feature vector of a memorized bad campaign. In some embodiments, the generated likelihood score may be expressed in an equation: $s=\Sigma_i \alpha_i \Sigma_j X_{ij} W_{ij}$, where s is a likelihood score to represent a likelihood of a content campaign violating policies, i represents the number of categories, j represents the number of items in the $i^{th}$ category, $\alpha_i$ is a category weight of the $i^{th}$ category, $X_i$ is a feature vector of $i^{th}$ category. $X_{ij}$ is the number of appearance for the $i^{th}$ category, which is zero in the most cases, $W_{ij}$ is an item weight of $i^{th}$ category associated with the $j^{th}$ item. An example is further described in detail below with regard to FIG. 2.

The model training module 170 trains the category weights and item weights of the memorization model using the training set, such that categories that are more relevant to bad content campaigns tend to have higher weight than categories that are less relevant, and for each category, items that are more relevant to bad content campaigns tend to have higher weight than items that are less relevant. For example, if most of image feature vectors from the training set include more malicious information, and most of title feature vectors from the training set include less malicious information, the model training module 170 may assign a higher weight to an image category than a title category, indicating that the image category is more predictive of bad content campaigns than the title category. In the image category, if a first item has more information violating account terms, and a second item has less information violating account terms, the model training module 170 may assign a higher weight to the first item than the second item, indicating that the first item is more predictive of bad content campaigns than the second item. The trained memorization model is stored in the model store 185. The trained memorization model generates a likelihood score to represent a likelihood of a content campaign violating policies based on a linear combination of category and item weights associated with the feature vectors. An example is further described in detail below with regard to FIG. 4.

In some embodiments, the model training module 170 trains a memorization model based one or more training algorithms. Examples of training algorithms may include mini-batch-based stochastic gradient descent (SGD), gradient boosted decision trees (GBDT), SVM (support vector machine), neural networks, logistic regression, naïve Bayes, memory-based learning, random forests, decision trees, bagged trees, boosted trees, or boosted stumps.

The policy implementation module 175 implements policies based in part on the memorization model generated by the model training module 170. The memorization model generates, for each content campaign, a likelihood score indicating how likely the content campaign will violate account terms. For example, for each content campaign, the feature extractor 165 derives feature vectors. The policy implementation module 175 also retrieves the trained memorization model from the memorization model store 185. The policy implementation module 175 applies the feature vectors to the trained memorization model. The memorization model categorizes the features vectors and compares each categorized feature vector with each item in a corresponding category. For each category, if a feature vector of the content campaign to be predicted matches an item in the category, the memorization model outputs a category weight associated with the category and an item weight associated with the matched item. The memorization model generates a likelihood score based on a linear combination of the outputted category weights and item weights associated with the feature vectors. An example is further described in detail below with regard to FIG. 2.

The policy implementation module 175 compares a likelihood score predicted by the memorization model with various ranges each corresponding to actions for the online system 140 to take in response to the predicted bad campaign. Examples of actions for the online system 140 to take include: disabling or deleting the predicted bad campaign and/or other information associated with the bad campaign (e.g., user ID, content in the content store 143, etc.), ignoring the predicted bad campaign, and additionally reviewing the predicted bad campaign. When a score indicates additional review of the predicted content campaign, the policy implementation module 175 may compile information to aid in reviewing the predicted bad campaign. For example, the policy implementation module 175 may compile data about how often the content campaign and the account creator have violated account terms and may organize the data according to the type of account terms that the account and the account creator have violated. In some embodiments, policy implementation module 175 determines a range of likelihood scores including the predicted likelihood score of the content campaign. Based on the range including the predicted likelihood score of the content campaign, a corresponding action is performed. For example, if the predicted likelihood score is determined to be in a lowest range of likelihood scores, the content campaign is determined to have a high level of trustworthiness and the content campaign is allowed to deliver to the online system's users. If the predicted likelihood score is determined to be in a highest range of likelihood scores, the content campaign is determined to have a low level of trustworthiness and the policy implementation module 175 disables or deletes the content campaign. However, if the predicted likelihood score is determined to be in a mid-level range of likelihood scores, the policy implementation module 175 sends the content campaign to human reviewers to determine if the content campaign violates account terms. If the human reviewers 320 determines that the content campaign violates account terms, the policy implementation module 175 disables or deletes the content campaign. If the human reviewers determines that the content campaign does not violate account terms, the policy implementation module 175 ignores the content campaign.

In some embodiments, the policy implementation module 175 takes actions based on a combination of the predicted likelihood scores of the memorization model and the dense model. An example is further described in detail below with regard to FIG. 3.

Applications of Memorization Model

Figure 2:
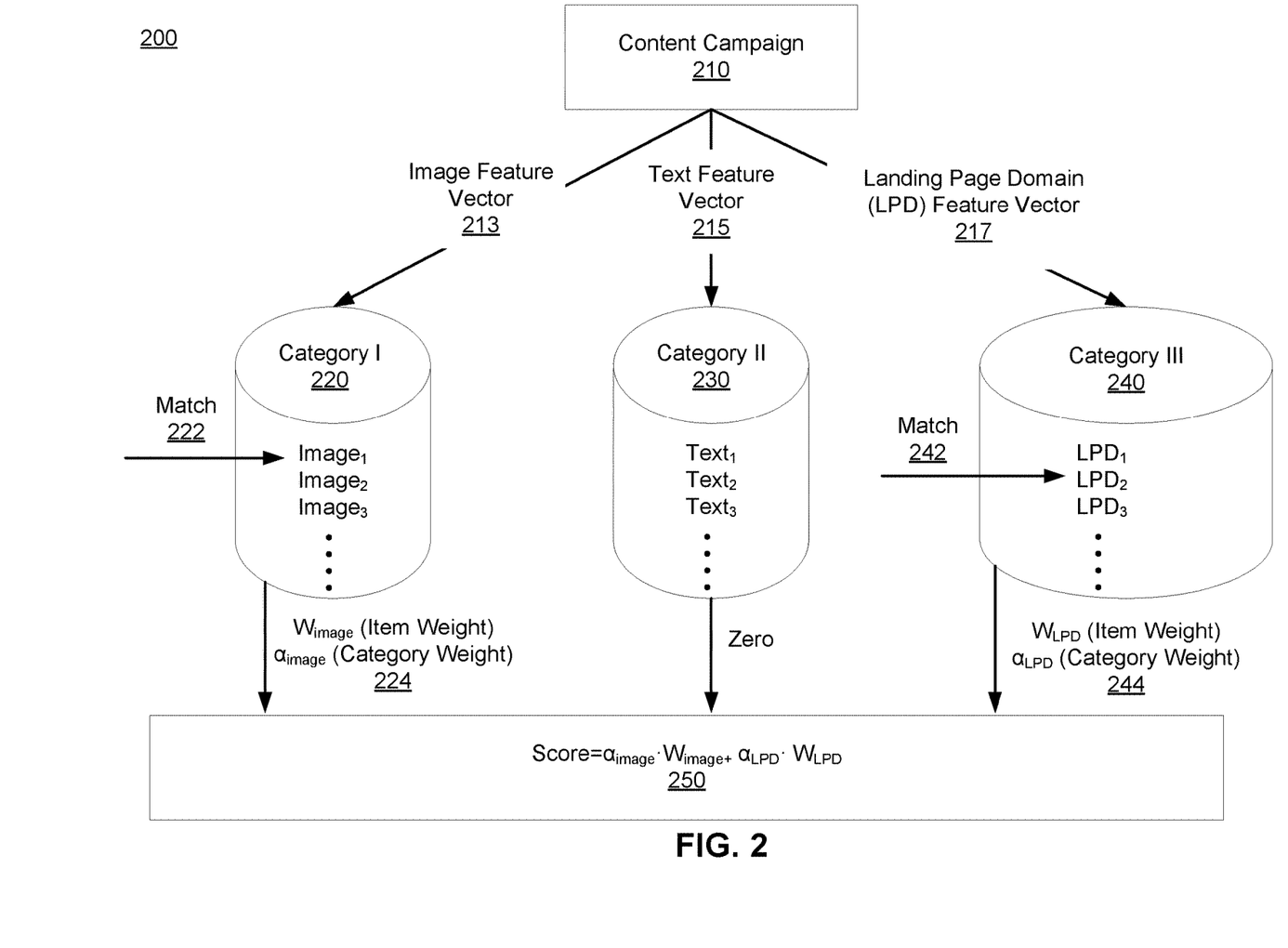
FIG. 2 is a diagram of a memorization model applied to a content campaign for predicting likelihood that the content campaign violates account terms, in accordance with an embodiment.

FIG. 2 is a diagram 200 of a memorization model applied to a content campaign 210 for predicting likelihood that the content campaign violates account terms, in accordance with an embodiment. Feature vectors of the content campaign 210 are extracted. The extracted feature vectors are an image feature vector 213, a text feature vector 215, and a LP domain (LPD) feature vector 217. The extracted feature vectors are categorized into a category I 220, a category II 230, and a category III 240, respectively. For the category I 220, the memorization model compares the image feature vector 213 with each item in the category I 220. The image feature vector 210 matches 222 the $image_1$. The memorization model outputs 224 an item weight $W_{image}$ associated with the $image_1$, and outputs 224 a category weight $\alpha_{image}$ associated with the category I 220. For the category I 230, the memorization model compares the text feature vector 215 with each item in the category II 230. The text feature vector 215 does not match any items in the textual category. The memorization model outputs a zero weight. For the category III 240, the memorization model compares the LPD feature vector 217 with each item in the category III 240. The LPD feature vector 217 matches 242 the $LPD_2$. The memorization model outputs 244 an item weight $W_{LPD}$ associated with the $LPD_2$, and outputs 244 a category weight $\alpha_{LPD}$ associated with the category III 240. The memorization model generates a likelihood score 250 based on a linear combination of the outputted category weights and item weights associated with the feature vectors, such as $\alpha_{image} \cdot W_{image} + \alpha_{LPD} \cdot W_{LPD}$.

In some embodiments, the online system 140 may use the memorization model in a combination with the dense model to provide an alternate judgment of the appropriateness of the content campaign. For example, the online system 140 may perform an action based on a combination of the predicted likelihood scores of the two models. In another example, the online system 140 may use outputs of one of the models as a training set to train the other model.

Figure 3:
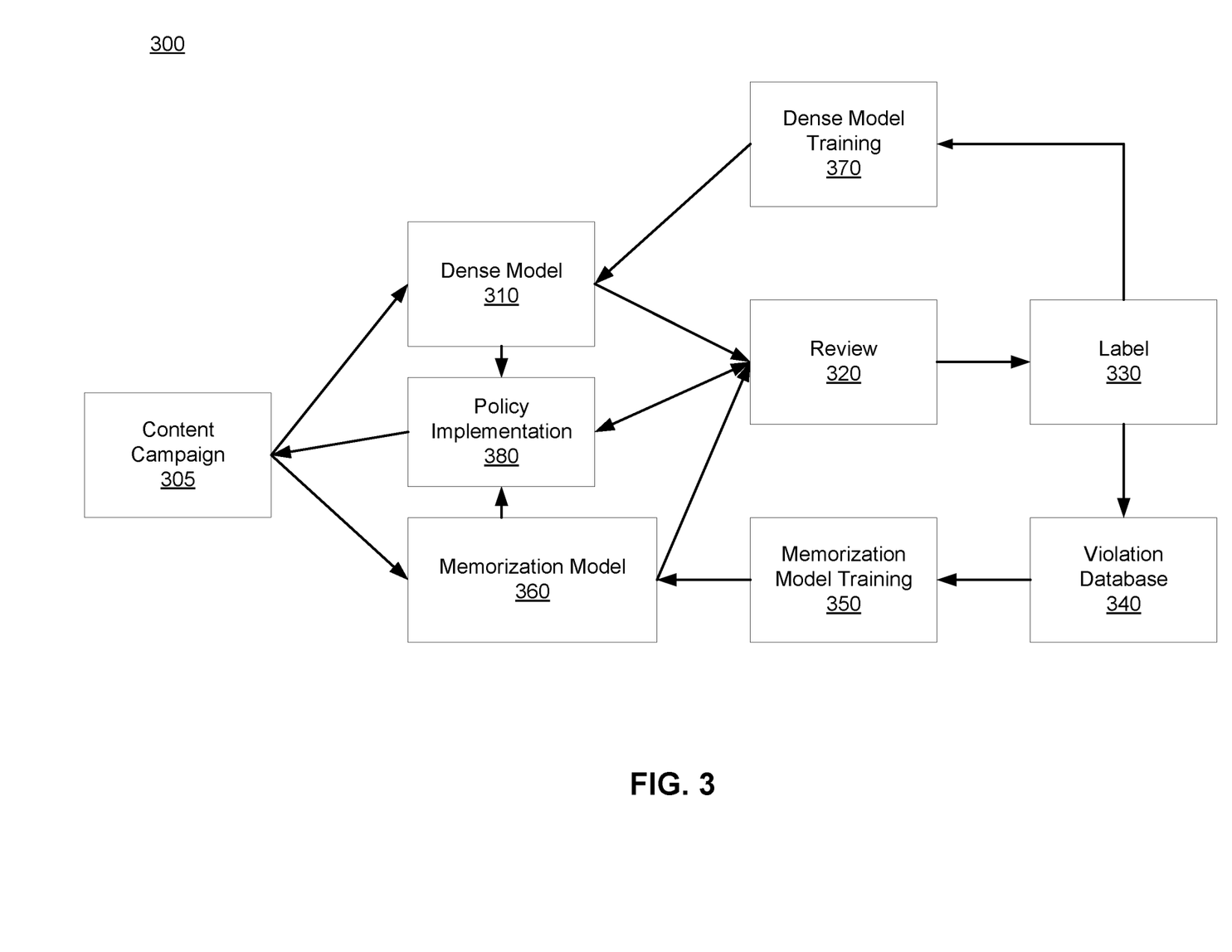
FIG. 3 is a diagram of a trained memorization model combined with a trained dense model applied to a content campaign for predicting likelihood that the content campaign violates account terms, in accordance with an embodiment.

FIG. 3 is a diagram 300 of a trained memorization model 360 combined with a trained dense model 310 applied to a content campaign 305 for predicting likelihood that the content campaign violates account terms, in accordance with an embodiment. The content campaign 310 is an input of the trained dense model 310 and of the trained memorization model 360. The trained dense model 310 and the trained memorization model 360 predict a likelihood score, respectively. Each predicted likelihood score indicates how likely the content campaign 305 violates account terms. The policy implementation 380 (e.g., the policy implementation 175) determines a range of likelihood scores including the predicted likelihood scores of the trained memorization model 360 and the trained dense model 310. Based on the range including the predicted likelihood scores, a corresponding action is performed. For example, if both predicted likelihood scores are determined to be in a lowest range of likelihood scores, the content campaign 305 is determined to have a high level of trustworthiness and the content campaign 305 is allowed to deliver to the online system's users. If at least one of the predicted likelihood scores is determined in a highest range of likelihood scores, the content campaign 305 is determined to have a low level of trustworthiness and the policy implementation 380 disables or deletes the content campaign 305. If one of the predicted likelihood scores is determined to be in a mid-level range of likelihood scores and the other one is determined to be in a lowest range of likelihood scores, or both likelihood scores are determined to be in a mid-level range of likelihood scores, the policy implementation 380 sends the content campaign 305 to human reviewers 320 to determine if the content campaign 305 violates account terms. If the human reviewers 320 determines that the content campaign 305 violates account terms, the policy implementation 380 disables or deletes the content campaign 305. If the human reviewers 320 determines that the content campaign 305 does not violate account terms, the policy implementation 380 ignores the content campaign 305.

The human reviewers review 320 the content campaign 305 and predicted likelihood scores generated by the two models to determine if a prediction of each model is correct. If the prediction based on the dense model 310 is correct, the content campaign is labeled 330. The labelled content campaign is added to a violation database 340 for memorization model training 350 to update the trained memorization model 360. If the prediction based on the memorization model 360 is correct, the content campaign is labeled 330. The labeled content campaign is added to a training set for dense model training 370 to update the trained dense model 310.

Memorization Model Training

Figure 4:
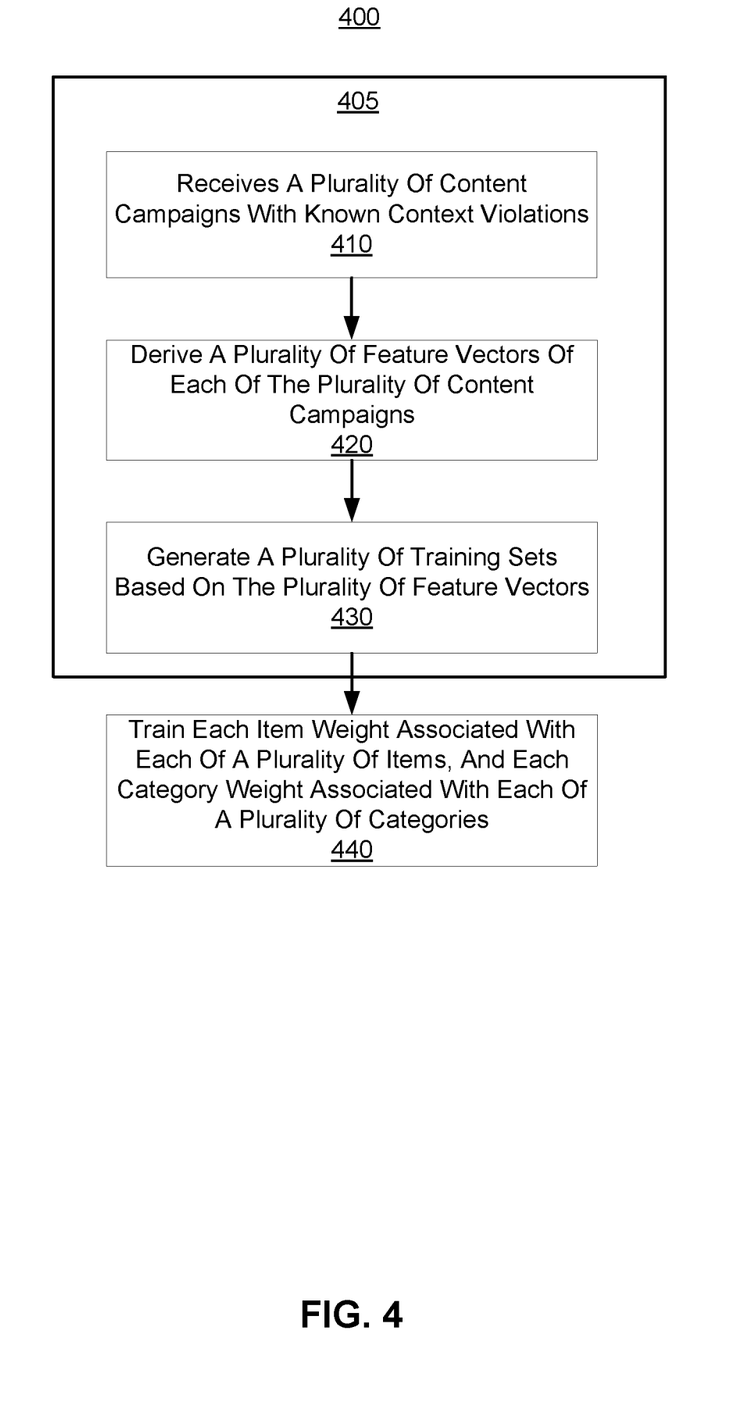
FIG. 4 is a flowchart illustrating a process for training a memorization model, in accordance with an embodiment.

FIG. 4 is a flowchart illustrating a process 400 for training a memorization model, in accordance with an embodiment. The process 400 may include different or additional steps than those described in conjunction with FIG. 4 in some embodiments or perform steps in different orders than the order described in conjunction with FIG. 4.

The online system 140 receives 110 a plurality of content campaigns with known context violations. For example, a content campaign is labeled based on human reviewers. Additionally and/or alternatively, the content campaign is from outputs of traditional models.

The online system 140 derives 420 feature vectors of each of the plurality of content campaigns. For example, for each of the plurality of content campaigns, the feature extractor 165 of the online system 140 derives feature vectors associated with characteristics of content that is created by the content campaign, and characteristics of context associated with the content campaign, as described above with regard to the feature extractor 165 of FIG. 1.

The online system 140 generates 430 a plurality of training sets based on the plurality of feature vectors. For example, the model training module 170 of the online system 140 generates a positive set and a negative set based on the plurality of feature vectors. Steps 410 to 430 can be repeated 405 for different content campaigns with known context violations to obtain a sufficiently large training set.

The online system 140 trains 440 each item weight associated with each of a plurality of items, and each category weight associated with each of a plurality of categories. For example, the model training module 170 trains the category weights and item weights of the memorization model using the training set, such that categories that are more relevant to bad content campaigns tend to have higher weight than categories that are less relevant, and for each category, items that are more relevant to bad content campaigns tend to have higher weight than items that are less relevant.

Policy Implementation Based on Memorization Model

Figure 5:
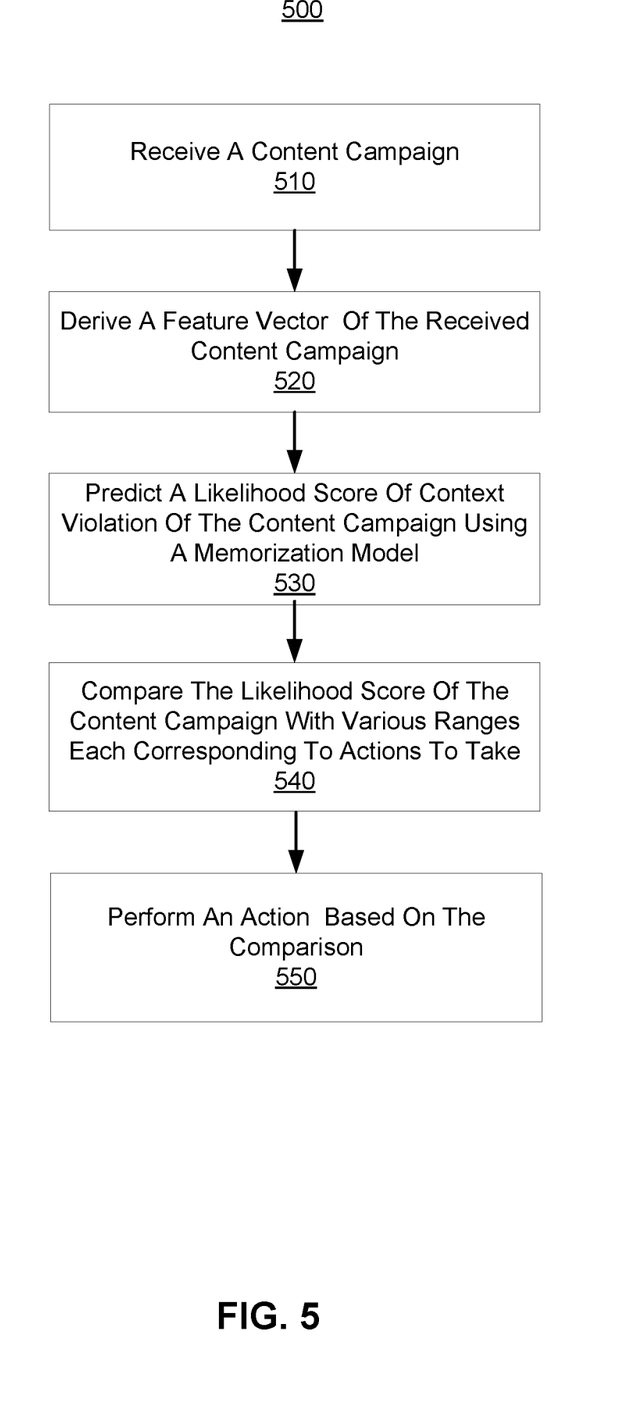
FIG. 5 is a flowchart illustrating a process for implementing a policy to a content campaign that is predicted to violate account terms based on a memorization model, in accordance with an embodiment.

FIG. 5 is a flowchart illustrating a process 500 for implementing a policy to a content campaign that is predicted to violate account terms based on a memorization model, in accordance with an embodiment. The process 500 may include different or additional steps than those described in conjunction with FIG. 5 in some embodiments or perform steps in different orders than the order described in conjunction with FIG. 5.

The online system 140 receives 510 a content campaign. The online system 140 derives 520 feature vectors of the received content campaign. The online system 140 predicts 530 a likelihood score of context violation of the content campaign using a memorization model. For example, the online system 140 retrieves the memorization model previously generated by the model training module 170. The memorization model generates a likelihood score based on a linear combination of the outputted category weights and item weights associated with the feature vectors. The online system 140 compares 540 the likelihood score of the content campaign with various ranges each corresponding to actions to take. The online system 140 performs 550 an action based on the comparison, as described above with respect to the policy implementation module 175 of FIG. 1. In some embodiments, the online system 140 performs 560 an action based on a combination of likelihood scores generated by the memorization model and a traditional model, as described above with respect to FIG. 3.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a nontransitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a nontransitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method performed by an online system, the method comprising:
    generating a memorization model for predicting likelihood scores of context violations for content campaigns, the generating comprising:
        identifying a plurality of item feature vectors for a plurality of content campaigns with known context violations, each item feature vector determined from a respective category of content campaign characteristics from a plurality of categories;
        training an item weight for each of the plurality of item feature vectors of each category, the item weight indicating a relevance of each item feature vector when it matches a feature vector of a content campaign; and
        training a category weight for each category, the category weight indicating a relevance of each category when an item feature vector determined from the category matches a feature vector of a content campaign; and
    receiving a content campaign for content to be presented to users of the online system;
    identifying a plurality of feature vectors for the received content campaign, each feature vector of the plurality of feature vectors determined from a respective category from the plurality of categories;
    predicting a likelihood score of context violations of the content campaign using the memorization model based on the plurality of feature vectors, the predicting comprising:
        for each feature vector of the plurality of feature vectors:
            comparing the feature vector to the plurality of item feature vectors identified by the memorization model;
            identifying a matching item feature of the respective category of the feature vector based on the comparison; and
            generating a combination of a trained category weight of the respective category of the feature vector and a trained item weight of the matching item feature vector;
        determining the predicted likelihood score based on the combinations determined for the plurality of feature vectors;
    determining the received content campaign violates a context policy of the online system based on the predicted likelihood score being included in a likelihood score range; and
    performing an action corresponding to the likelihood score range, the action addressing the violation of the context policy by the content campaign.

2. The computer-implemented method of claim 1, wherein each feature vector of the plurality of feature vectors comprises:
    characteristics of content of the content campaign determined from the respective category of content campaign characteristics; and
    characteristics of a context of the content campaign determined from the respective category of content campaign characteristics.

3. The computer-implemented method of claim 1, wherein the predicted likelihood score is a linear combination of the combinations determined for the plurality of feature vectors.

4. The computer-implemented method of claim 1, wherein the action is selected from a group consisting of: disabling or deleting the content campaign, disabling or deleting information associated with the content campaign, ignoring the content campaign, reviewing the content campaign, and any combination thereof.

5. The computer-implemented method of claim 1, wherein performing the action comprises:
    comparing the predicted likelihood score to a plurality of likelihood score ranges including the likelihood score range, each likelihood score range associated with an action; and
    selecting the action corresponding to the likelihood score range including the predicted likelihood score from the plurality of likelihood score ranges.

6. The computer-implemented method of claim 5, wherein performing the action further comprises:
    comparing an additional predicted likelihood score of context violations of the content campaign with the plurality of likelihood score ranges, wherein the additional predicted likelihood score is generated by an additional prediction model; and
    selecting an action corresponding to a combination of the likelihood score range that includes the predicted likelihood score and a likelihood score range that includes the additional predicted likelihood score.

7. The computer-implemented method of claim 1, wherein generating the memorization model further comprises:
    receiving the plurality of content campaigns with known context violations;
    identifying a set of item feature vectors from each of the plurality of content campaigns;
    generating a training set based on the sets of item feature vectors, the training set comprising a positive set including item feature vectors identified for content campaigns of the plurality of content campaigns which violate account terms of the online system; and
    training, based on the training set, each item weight associated with each of the plurality of item feature vectors and each category weight associated with each of the plurality of categories.

8. The computer-implemented method of claim 7, wherein the item weights for each of the plurality of item feature vectors and the category weights for each of the plurality of categories are trained jointly.

9. The computer-implemented method of claim 7, wherein each of the plurality of content campaigns are labeled based on a likelihood score of context violations of each content campaign determined by an additional prediction model.

10. A non-transitory computer-readable medium comprising computer program instructions that when executed by a computer processor of an online system causes the processor to perform steps comprising:
generating a memorization model for predicting likelihood scores of context violations for content campaigns, the generating comprising:
identifying a plurality of item feature vectors for a plurality of content campaigns with known context violations, each item feature vector determined from a respective category of content campaign characteristics from a plurality of categories;
training an item weight for each of the plurality of item feature vectors of each category, the item weight indicating a relevance of each item feature vector when it matches a feature vector of a content campaign; and
training a category weight for each category, the category weight indicating a relevance of each category when an item feature vector determined from the category matches a feature vector of a content campaign; and
receiving a content campaign for content to be presented to users of the online system;
identifying a plurality of feature vectors for the received content campaign, each feature vector of the plurality of feature vectors determined from a respective category from the plurality of categories;
predicting a likelihood score of context violations of the content campaign using the memorization model based on the plurality of feature vectors, the predicting comprising:
for each feature vector of the plurality of feature vectors:
comparing the feature vector to the plurality of item feature vectors identified by the memorization model;
identifying a matching item feature of the respective category of the feature vector based on the comparison; and
generating a combination of a trained category weight of the respective category of the feature vector and a trained item weight of the matching item feature vector;
determining the predicted likelihood score based on the combinations determined for the plurality of feature vectors;
determining the received content campaign violates a context policy of the online system based on the predicted likelihood score being included in a likelihood score range; and
performing an action corresponding to the likelihood score range, the action addressing the violation of the context policy by the content campaign.

11. The non-transitory computer-readable medium of claim 10, wherein each feature vector of the plurality of feature vectors comprises:
characteristics of content of the content campaign determined from the respective category of content campaign characteristics; and
characteristics of a context of the content campaign determined from the respective category of content campaign characteristics.

12. The non-transitory computer-readable medium of claim 10, wherein the predicted likelihood score is a linear combination of the combinations determined for the plurality of feature vectors.

13. The non-transitory computer-readable medium of claim 10, wherein the action is selected from a group consisting of: disabling or deleting the content campaign, disabling or deleting information associated with the content campaign, ignoring the content campaign, reviewing the content campaign, and any combination thereof.

14. The non-transitory computer-readable medium of claim 10, wherein performing the action comprises:
comparing the predicted likelihood score to a plurality of likelihood score ranges including the likelihood score range, each likelihood score range associated with an action; and
selecting the action corresponding to the likelihood score range including the predicted likelihood score from the plurality of likelihood score ranges.

15. The non-transitory computer-readable medium of claim 14, wherein performing the action further comprises:
comparing an additional predicted likelihood score of context violations of the content campaign with the plurality of likelihood score ranges, wherein the additional predicted likelihood score is generated by an additional prediction model; and
selecting an action corresponding to a combination of the likelihood score range that includes the predicted likelihood score and a likelihood score range that includes the additional predicted likelihood score.

16. The non-transitory computer-readable medium of claim 10, wherein generating the memorization model further comprises:
receiving the plurality of content campaigns with known context violations;
identifying a set of item feature vectors from each of the plurality of content campaigns;
generating a training set based on the sets of item feature vectors, the training set comprising a positive set including item feature vectors identified for content campaigns of the plurality of content campaigns which violate account terms of the online system; and
training, based on the training set, each item weight associated with each of the plurality of item feature vectors and each category weight associated with each of the plurality of categories.

17. The non-transitory computer-readable medium of claim 16, wherein the item weights for each of the plurality of item feature vectors and the category weights for each of the plurality of categories are trained jointly.

18. The non-transitory computer-readable medium of claim 16, wherein each of the plurality of content campaigns are labeled based on a likelihood score of context violations of each content campaign determined by an additional prediction model.

* * * * *

UNITED STATES PATENT AND TRADEMARK OFFICE
CERTIFICATE OF CORRECTION

PATENT NO. : 10,853,838 B2
APPLICATION NO. : 15/608803
DATED : December 1, 2020
INVENTOR(S) : Mu et al.

Page 1 of 1

It is certified that error appears in the above-identified patent and that said Letters Patent is hereby corrected as shown below:

On the Title Page

Item (51), in Column 1, under "Int. Cl.", Line 5, after "G06Q" delete "50/00" and insert -- 50/01 --, therefor.

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*